M. STOCKLMIER.
EDUCATIONAL NOVELTY.
APPLICATION FILED DEC. 2, 1909.
971,865.
Patented Oct. 4, 1910.
2 SHEETS—SHEET 1.
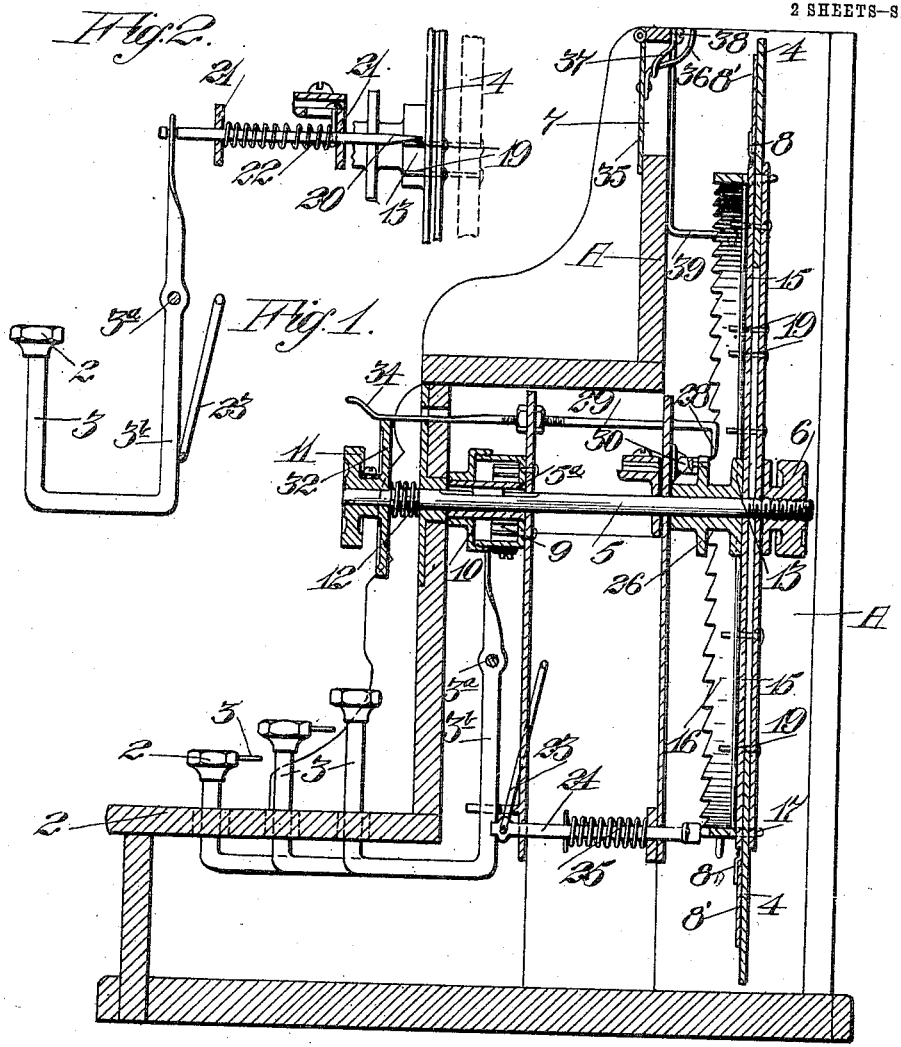
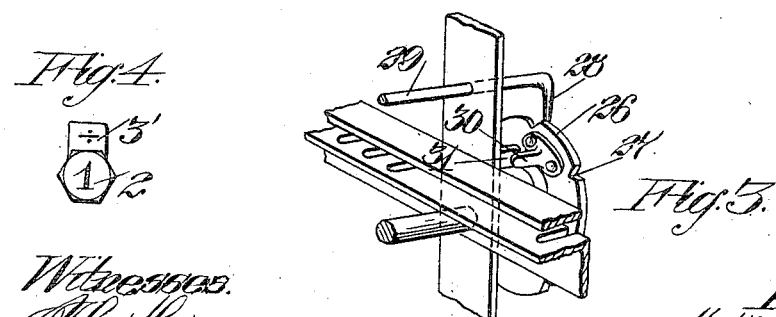

M. STOCKLMIER.
EDUCATIONAL NOVELTY.
APPLICATION FILED DEC. 2, 1909.
971,865.
Patented Oct. 4, 1910.
2 SHEETS—SHEET 2.
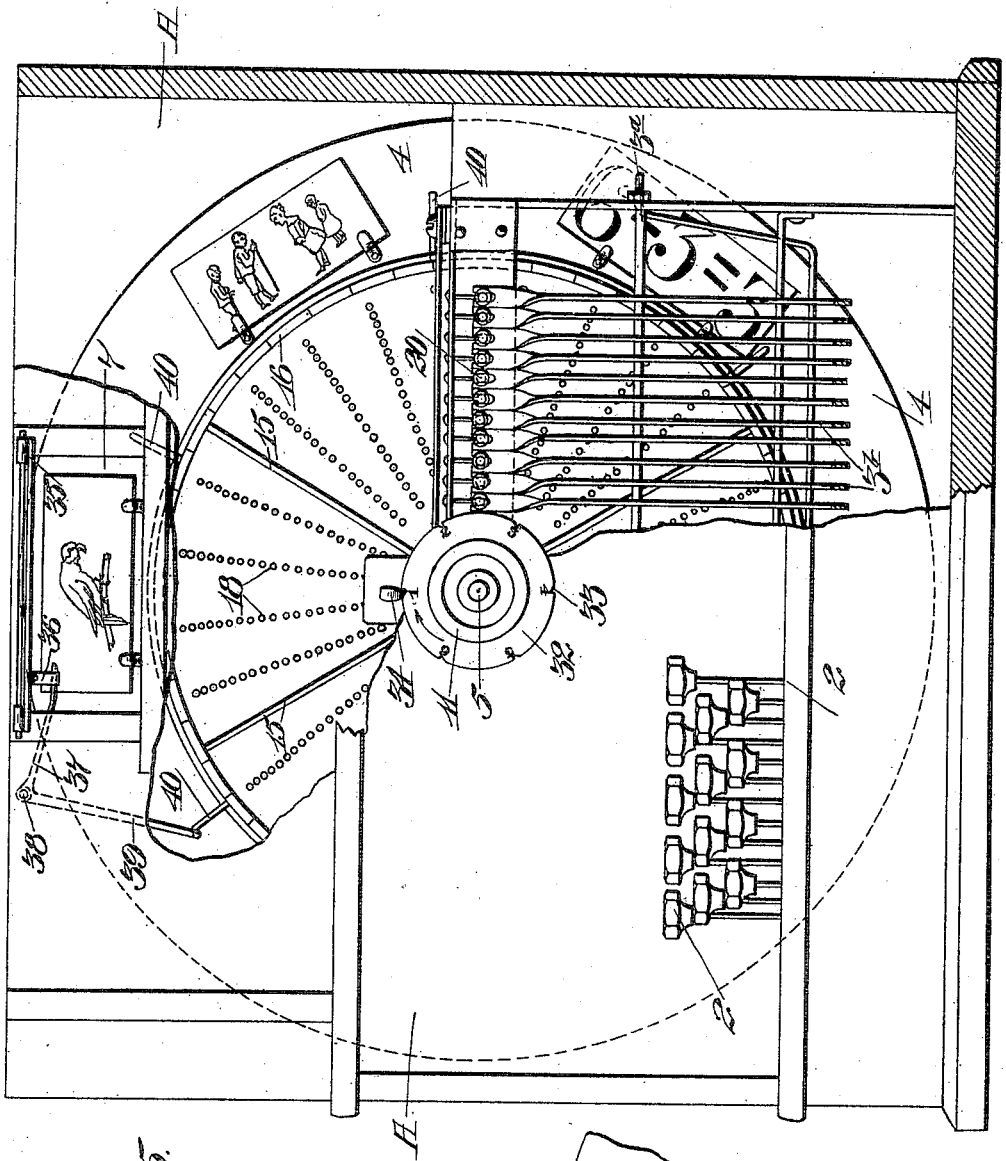
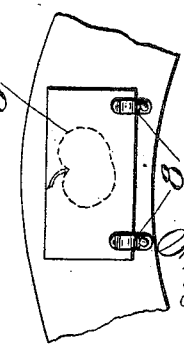

UNITED STATES PATENT OFFICE.

MATTHIAS STOCKLMIER, OF CUPERTINO, CALIFORNIA, ASSIGNOR OF ONE-SIXTH TO ALFRED P. LAHMER AND ONE-SIXTH TO G. JOHN LENS, OF SAN JOSE, CALIFORNIA.

EDUCATIONAL NOVELTY.

971,865.      Specification of Letters Patent.      Patented Oct. 4, 1910.

Application filed December 2, 1909. Serial No. 530,970.

*To all whom it may concern:*

Be it known that I, MATTHIAS STOCKLMIER, citizen of the United States, residing at Cupertino, in the county of Santa Clara and State of California, have invented new and useful Improvements in Educational Novelties, of which the following is a specification.

This invention relates to amusement devices, and particularly pertains to educational novelties.

A purpose of the invention is to provide an inexpensive, easily manipulated apparatus embodying a combination of mechanisms designed to excite curiosity, afford entertainment, and to develop the intellect of children by presenting a series of practical object-lessons requiring the exercise of the mind, the eye and the hand.

The invention consists of the parts and the construction and combination of parts as hereinafter more fully described and claimed, having reference to the accompanying drawings, in which—

Figure 1 is a central vertical section of the device. Fig. 2 is a detail of the escapement. Fig. 3 illustrates in perspective the selector. Fig. 4 is a detail of one of the keys. Fig. 5 is a front elevation of the machine broken away to show the platen and key-levers. Fig. 6 is a detail view showing the card-holders.

In a machine actually constructed and perfected in operation, I have inclosed the mechanism in a suitably formed casing A having a conveniently disposed keyboard 2, the keys of which are carried by the angular levers 3 fulcrumed upon a rod $3^a$. The key-levers are adapted, through means to be hereinafter described, to control the motion of a pattern member and display disk 4 which is removably secured to a suitably journaled shaft 5 by the flanged nut 6 screwing on to the end of the shaft and holding the disk against the hub 13.

In the upper front portion of the casing A is a small window or aperture 7, and that portion of the surface of the disk 4 which is adjacent the window, so as to be visible through it, is provided with appropriate card-holders 8 into which are insertible cards 8′ bearing pictures, puzzles, examples in arithmetic and their solutions, names of animals, or proper names, etc. If the pupil or child successfully spells a word, or performs an example, by properly manipulating the keys 2, the disk 4 will revolve and at the right moment will stop and present the card which pictorially represents the word or example opposite the aperture 7 of the case A.

To accomplish the automatic rotation in one direction of the disk 4, the shaft 5 is slidable in and turnable with a sleeve $5^a$, to which is secured a mainspring 9; the other end of the spring being secured to some convenient point, as the box or drum 10 which houses the sleeve $5^a$. The shaft and disk are movable back and forth lengthwise of the sleeve by means of a milled head 11 on the outer end of the shaft 5. Pushing in on the handle member 11 compresses a spring 12, the function of which is to normally maintain the shaft 5 and disk 4 in a forward position, *i. e.*, toward the operator, for the purpose shortly to be described. Hub 13 against which the disk 4 is clamped, is provided with spokes 15 which carry a circular locking rack or ring 16. One function of rack-ring 16 is to support the disk and prevent it from turning independently on the shaft 5 by the rearwardly extending set-pins 17 which fit holes in the disk. Another object of the rack-ring 16 is to provide means for limiting the rotative movement of the disk when released by a key, as will be shortly explained.

The disk 4 has its central area radially and concentrically perforated, as shown at 18. These perforations are adapted to receive removable stop-pins 19. The perforations 18 are arranged in concentric rows, and for the twenty-six letters of the alphabet there would be twenty-six of these rows. If numerals or other characters operated from keys independent of the ordinary alphabet keys are necessary or desired, there would be additional rows; but with twenty-six keys there need only be twenty-six of the concentrically arranged rows of holes 18. In the machine which I have built and successfully operated, the same keys which stand for the letters of the alphabet also represent numerals and the various arithmetical signs, plus (+), minus (−), etc.; the numeral bearing keys having metal projections 3′ on which the numerals or characters other than the letters of the alphabet are placed, these little metal projections serving as indicators for these particular keys, Figs. 1 and 4. The pins 19 are secured in the holes 18 in any suitable manner, and project through to the front so as to be intercepted by corresponding escapement-rods 20 which are operated from the keys. There is one of these escapement-rods 20 for each key, and all the rods are preferably arranged in a horizontal plane and in the line of a diameter of the disk. With twenty-six keys, represented in my actual machine, there would be thirteen of these rods on one side of the center of disk 4, and thirteen on the other side, and these rods are all so positioned that they will intercept certain pins 19 placed in the holes 18 which correspond to the keys, as before stated. The rods 20 are suitably supported for sliding motion in fixed guides 21, and are operated on by springs 22 which act normally to press these rods forward into the path of corresponding stop-pins 19 on the disk. Each rod 20 is suitably connected with the upper end of a key-lever 3, Fig. 2, so that when a key is depressed its escapement-rod 20 will be drawn outward to disengage its pin 19 and to compress the spring 22, which latter acts to return the key and escapement-rod 20 to initial position, when pressure on the key is released. The upright portions 3$^b$ of all the key-levers 3 are preferably arranged in the same vertical plane, so that when any one of these keys is actuated, it will rock a pivotally suspended cross-bar 23 to cause the latter to push in on a spring-actuated dog 24 and project the forward end of this dog into the path of the rack-teeth on ring 16. A spring 25 acts normally to press the dog 24 away from interference with the ratchet-ring 16. The teeth on the ratchet-ring 16 are spaced apart corresponding to one step movement of the rotatable disk 4; it being understood that when the shaft 5 and disk 4 have been turned in one direction by means of the handle 11 to place the mainspring 9 under tension, that by a proper operation of the keys the disk is permitted to have a step by step rotative movement in the opposite direction, as will be seen shortly.

The hub 13 has a flange 26 which is notched, as shown at 27, and 28 is a rigid guide finger arranged radially of the hub and carried by an adjustably supported fixed rod 29. The finger 28 is designed normally to engage behind the flange 26, as shown in Figs. 1 and 3, so as to hold the disk in forward position, with the pins 19 disposed in the path of the escapement rods 20, Fig. 2; the rear position of the disk 4 when pushed back so as to bring the guide finger 28 in front of the flange 26 being represented approximately by dotted lines, Fig. 2. The rotative movement of the disk is limited in either direction to one complete revolution by means of a stop 30, Fig. 3, on flange 26 encountering a fixed stop 31. There is a notch 27 on flange 26 for each one of the picture-cards 8' on the rim of disk 4, and these notches and cards are preferably arranged at equidistances circumferentially of the disk. Also, there is a dial member 32 on the front exposed end of shaft 5, and this dial member is notched, as shown at 33, correspondingly with the notches 27 and the cards 8'. In the actual machine referred to there are six cards 8', and consequently six notches 27 and six notches 33. The notches 33 on dial 32 are preferably numbered from one to six, as shown in Fig. 5. The notches 33 are adapted to be engaged by a spring latch or detent member 34 which is here shown in continuation of the rod 29. Whenever the detent 34 is engaged with a notch 33 on dial 32, the guide finger 28 is in line with a corresponding notch 27 on flange 26, and a display card 8' is in front of the window 7. It is then that the operator is able to push in on the handle 11 and carry the flange 26 back behind the guide projection 28, so as to allow the shaft 5 to be turned in either direction. Each notch 33 on dial 32 represents a different combination or lesson, these combinations or lessons being represented by the cards 8'. For instance, in the machine which I have built, combination one is represented by the picture of a parrot; and with the machine wound up to bring No. 1 notch on dial 32 into engagement with the spring detent 34, the pressing of the keys corresponding to the letters p-a-r-r-o-t in succession, will cause the disk to rotate step by step, and when the detent 34 catches in notch No. 2, the picture of a parrot will appear in the window 7. Combination two of the machine in question calls for the correct spelling of the words " boys and girls," and when these words have been correctly spelled, the disk rotating one step each time the correct key is depressed, a card 8' with the picture of boys and girls will appear at the window 7, at the same time that detent 34 catches in notch No. 3 on dial 32. And so for each of the other notches 33 on dial 32 there is a different lesson or example. With a dial having six lessons upon it, the dial moves one-sixth of a revolution and is stopped by the detent 34 on the correct solution of each lesson; it being understood that the step by step movement of the dial is accomplished by the retraction of the escapement-rod 20 out of the path of the corresponding pin 19, and the dial being stopped immediately by the inward projection of the dog 24 to catch a tooth on the ring 16.

In order to enhance the interest of the pupil, the window 7 is provided with a normally closed hinged shutter 35 which has a rearwardly curved arm 36 adapted to be engaged by a bell-crank 37 fulcrumed at 38 on the inside of the casing A. The bell-crank 37 has an arm 39 which is adapted, the moment a card 8' is brought opposite the window 7, to be encountered by a radial pin 40 carried for convenience on ring 16. The engagement of the pin 40 with the arm 39 will rock the bell-crank, which in turn will pull down on arm 36 and lift the shutter, exposing the card behind.

The operation of the machine is as follows: If the disk is made with six combinations, that is, it is designed to represent six examples or lessons, there would be six cards 8'. The space on the disk between these six cards is divided into six imaginary sectors, and the pins 19 corresponding to the letters or other characters used in solving these lessons are suitably placed in appropriate sectors corresponding with the keys on the keyboard, and which keys represent the letters or symbols to be used. For instance, with the word "parrot" six pins 19 are inserted into different perforations known to correspond to the keys on the keyboard which will be used. As the word "parrot" contains the double letter "r," two of the pins will be placed one behind the other at equidistances from the center of the shaft 5. Likewise, other pins are suitably positioned in their perforations for the various other combinations to be employed. Assuming that "parrot" is the first example to be illustrated, the disk is turned to put the spring under tension by first pushing back on the handle 11 to carry the notched flange 26 back behind the guide finger 28, so that the disk will not be interfered with by the escapement-rods 20. When the dial 32 is brought with its No. 1 notch 33 in line with detent 34, the shaft and dial are shifted forward again to carry the finger 28 in behind the flange 26. In that position a pin corresponding to the letter "p" is bearing against its corresponding escapement-rod 20, so that when the operator releases his hold on the handle 11, the disk is prevented temporarily from turning under the action of the spring 9. The operator then presses on the letter "p," which retracts the corresponding escapement member 20. At the same time pawl 24 is pushed in by contact of the corresponding key-lever with the rocker bar 23, so that as the escapement-bar 20 releases its pin 19, the dog 24 catches in the next tooth of the rack 16. This checks the rotating movement of the disk and relieves the pins 19 of any tendency to be bent by suddenly striking against the forwardly projecting rods 20. This depression of the key lettered "p," and the consequent one-step rotating movement of disk 4, carries the flange 26 around, so that the finger 28 is out of line with any of the notches. Consequently the rod 5 cannot be pushed back, and neither can it nor the disk 4 be turned in either direction, because the pins 19 will engage some one or other of the escapement-bars 20 above and below. Hence, when one has started to solve a puzzle or lesson, he must depress all the keys necessary to the solution of the lesson before a notch 27 in flange 26 is brought again into line with the fixed guide finger 28. After correctly depressing the key lettered "p" in the spelling of the word "parrot," the operator next depresses the key lettered "a," and the operation is repeated. Correspondingly the key lettered "r" is depressed twice in succession, the dog 24 engaging in the teeth of the rack 16 each time, so that the disk is never allowed to turn more than one tooth space on rack 16, or one pin space, so long as a key on the keyboard is depressed. The moment, however, the last key, lettered "t" in the spelling of the word "parrot," is depressed and released, and there being no pins 19 in further interference with the escapement-rods 20, the disk turns the remaining portion of one-sixth of a revolution under the action of the mainspring 9, and until the latch 34 catches in a notch 33 on dial 32, thus bringing the moving parts to rest. At the same time the radial projection 40 hits arm 39 on bell-crank 37 and operates the shutter 35, so as to open the window 7 and display the picture of a parrot on the card 8', indicating to the pupil the correct solution of the lesson.

Having thus described my invention, what I claim and desire to secure by Letters Patent is—

1. The combination of a rotary member having a series of display portions, means for placing said member under tension to cause it normally to turn in one direction, and means including a series of key-levers and a corresponding series of escapement devices, to control the rotative movement of said member step by step.

2. The combination of a casing having a window, a rotary member within the casing having a series of display portions adapted to be brought in succession in front of said window, means for placing the member under tension to cause it normally to turn in one direction, and means including a series of key-levers and a corresponding series of escapement elements, to control the rotative movement of said member step by step.

3. The combination of a casing having a window, a rotary disk housed in the casing and having a series of display members adapted to be brought in succession in front of the window, a series of stops on the disk, and means to control the rotative movement of the disk, said last-named means including a series of keys and a series of escapement-rods engageable with corresponding stops on the disk.

4. The combination of a casing having a window, a rotary disk housed in the casing and having a series of display members adapted to be brought in succession in front of the window, a series of stops on the disk, and means to control the rotative movement of the disk, said last-named means including a series of keys and a series of escapement-rods engageable with corresponding stops on the disk, with means independent of the rods and operable by the keys for otherwise limiting the movement of the disk.

5. The combination with a cabinet, of a rotary disk housed therein, means for causing the disk to tend to turn normally in one direction, a series of keys, stops carried by the disk, and a series of escapement elements under the control of corresponding keys whereby the disk may rotate a definite predetermined distance only on the operation of a particular and predetermined group of keys.

6. The combination with a cabinet, of a rotary disk housed therein, means for causing the disk to tend to turn normally in one direction, a series of keys, stops carried by the disk, and a series of escapement elements under the control of the keys whereby the disk may rotate a definite predetermined distance only on the operation of a particular and predetermined group of keys, said stops on the disk being adjustable to permit of various changes in the groups of keys to be operated.

7. The combination with a cabinet, of a rotary disk therein, a shaft upon which said disk is mounted, means to impart motion to the shaft in one direction, adjustable stop-pins carried by the disk, keys, and escapement members operated by the keys and engageable with the stop-pins on the disk.

8. The combination with a cabinet, of a rotary disk therein, a shaft upon which said disk is mounted, means to impart motion to the shaft in one direction, the shaft having a lengthwise sliding movement, adjustable stop-pins carried by the disk, keys, escapement members operated by the keys and engageable with the stop-pins on the disk, and means to limit the sliding movement of the shaft.

9. The combination with a cabinet, of a rotary disk therein, a shaft upon which said disk is mounted, means to impart motion to the shaft in one direction, adjustable stop-pins carried by the disk, keys, escapement members operated by the keys and engageable with the stop-pins on the disk, and means independent of the escapement members engageable with the disk to limit the rotative movement of the disk when a key is depressed.

10. The combination with a cabinet, of a rotary disk therein, means for imparting motion to the disk in one direction, a set of keys, a corresponding set of escapement elements, operated by the keys, and means carried by the disk engaged by the escapement elements whereby the disk is allowed a desired rotary movement by the successive depression of a predetermined selected group of keys.

11. The combination of a cabinet, a rotary disk therein, a lengthwise sliding shaft for the disk, means for pressing the shaft normally in one direction, means normally limiting the movement of the shaft in the opposite direction, adjustable stop-pins on the disk, keys, escapement members operated by the keys interposable in the path of the stop-pins, and means independent of the escapement members and operable by the keys for limiting the step by step movement of the disk.

12. The combination of a cabinet, a rotary disk therein, a lengthwise sliding shaft for the disk, means for pressing the shaft normally in one direction, means normally limiting the movement of the shaft in the opposite direction, adjustable stop-pins on the disk, keys, escapement members operated by the keys interposable in the path of the stop-pins, and means independent of the escapement members and operative by the keys for limiting the step by step movement of the disk, said last-named means including a spring-actuated dog operable on a ratchet-ring on the disk.

13. The combination of a cabinet, a rotary disk therein, a lengthwise sliding shaft for the disk, means for pressing the shaft normally in one direction, means normally limiting the movement of the shaft in the opposite direction, adjustable stop-pins on the disk, keys, escapement members operated by the keys interposable in the path of the stop-pins, and means independent of the escapement members and operative by the keys for limiting the step by step movement of the disk, the cabinet having a window, and the disk having display members adapted to be brought successively into position before the window on the proper selection of a group of keys.

14. The combination with a suitable casing, of a display member concealed therein, means for rotating said member, a series of keys and a series of escapement members operated by the keys and permitting the member to have an intermittent rotary motion.

15. The combination with a suitable casing having a window opening, of a movable display member concealed in said casing, an automatic shutter normally closing said window opening, a series of keys, means controlled by said keys for giving the display member an intermittent movement, and means for operating the shutter by said display member.

16. In a device of the character described, a revoluble display member, means for moving said member in a uniform direction, escapement mechanism operative on the display member, and keys controlling said mechanism.

17. In an educational device, a casing, a rotary carrier inclosed therein, means for automatically revolving said carrier in one direction, a plurality of keys, and means controlled by said keys and operative on the carrier for governing its motion.

18. A lesson illustrating machine embodying a suitable casing, an illustrated rotary disk, mechanism including a series of keys and a series of escapement members for said disk, power mechanism for actuating the disk, means by which the movement of the disk is controlled, and an automatic shutter covering an aperture in said casing operated by the disk.

19. The combination of a casing, a disk therein, means for automatically revolving said disk, a series of stops on the disk, escapement elements for holding the disk against turning, a dial provided with notches, said dial being located at the front of the casing, and a series of keys controlling the said means for temporarily holding the disk against turning movement.

20. A casing, an automatic shutter adapted to cover an aperture in said casing, a concealed movable disk, means for automatically revolving said disk, a dial in front of the casing, stops on the disk, an escapement means engageable with the stops, and keys controlling said escapement means.

In testimony whereof I have hereunto set my hand in the presence of two subscribing witnesses.

MATTHIAS STOCKLMIER.

Witnesses:
  OTTO KRAUSE,
  FRANCES E. QUINN.